United States Patent [19]

Asami et al.

[11] Patent Number: 4,715,616

[45] Date of Patent: Dec. 29, 1987

[54] REAR SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Japan

[21] Appl. No.: 812,351

[22] Filed: Dec. 23, 1985

[30] Foreign Application Priority Data

Dec. 25, 1984 [JP] Japan ............................. 59-276513
Dec. 27, 1984 [JP] Japan ............................. 59-275824

[51] Int. Cl.$^4$ ............................................. B60G 11/26
[52] U.S. Cl. ..................................... 280/707; 180/41; 280/6 R
[58] Field of Search ............. 280/707, DIG. 1, 6 H, 280/6.1, 6 R; 180/41

[56] References Cited

U.S. PATENT DOCUMENTS

| 2,973,969 | 3/1961 | Thall | 280/124 |
|---|---|---|---|
| 2,978,254 | 8/1961 | Bundorf | 280/104 |
| 3,003,783 | 10/1961 | Brueder | 280/707 |
| 3,632,131 | 1/1972 | Engfer | 280/707 |
| 3,884,496 | 5/1975 | Ito et al. | 280/708 |
| 4,162,083 | 7/1979 | Zabler | 280/703 |
| 4,185,845 | 1/1980 | Misch et al. | 280/6 H |
| 4,350,354 | 9/1982 | Dotti et al. | 280/6 H |
| 4,364,574 | 12/1982 | Saito | 280/6 R |
| 4,368,900 | 1/1983 | Beusse | 280/707 |
| 4,396,202 | 8/1983 | Kami | 280/6 R |
| 4,401,310 | 8/1983 | Ishikawa et al. | 280/6.1 |
| 4,402,375 | 9/1983 | Glaze | 180/169 |
| 4,433,849 | 2/1984 | Ohmori | 280/6 R |
| 4,466,625 | 8/1984 | Kondo et al. | 280/6 R |
| 4,513,833 | 4/1985 | Sheldon | 180/9.1 |
| 4,526,401 | 7/1985 | Kakezaki et al. | 280/707 |
| 4,540,188 | 9/1985 | Meloche et al. | 280/707 |
| 4,579,366 | 4/1986 | Doi et al. | 280/707 |
| 4,589,676 | 5/1986 | Meloche et al. | 280/707 |
| 4,593,920 | 6/1986 | Natsume et al. | 280/6 R |
| 4,595,072 | 6/1986 | Barnea | 180/169 |

FOREIGN PATENT DOCUMENTS

| 0091017 | 10/1983 | European Pat. Off. . |
|---|---|---|
| 3002765 | 7/1981 | Fed. Rep. of Germany . |
| 3403649 | 8/1984 | Fed. Rep. of Germany . |
| 3407260 | 9/1984 | Fed. Rep. of Germany . |
| 2225303 | 4/1974 | France . |
| 1485003 | 9/1977 | United Kingdom . |
| 2080213 | 2/1982 | United Kingdom . |
| 3045690 | 7/1982 | United Kingdom . |
| 57-172808 | 10/1982 | Japan . |
| 58-30542 | 2/1983 | Japan . |
| 48309 | 9/1983 | Japan . |
| 59-23713 | 2/1984 | Japan . |
| 59-26638 | 2/1984 | Japan . |
| 59-23712 | 2/1984 | Japan . |
| 59-129613 | 8/1984 | Japan . |
| 59-1324089 | 9/1984 | Japan . |
| 59-63218 | 10/1984 | Japan . |
| 47711 | 3/1985 | Japan . |

OTHER PUBLICATIONS

European Search Report for Application No. EP 86 10 1360.
Patent Abstracts of Japan, vol. 8, No. 166 (M-134) [1603], Aug. 2, 1984.
(840,258) Mizuguchi, M., *Chassis Electronic Control Systems for the Mitsubishi 1984 Galant*, Society of Automotive Engineers, 3184, 280-707.
Patent Abstract of Japan, vol. 8, No. 116 (M-299) [1553], May 30, 1984; JP-A-5923712 (Hino Jidosha) 07-02-1983 (Cat. D,A).
European Search Report for Application No. EP 86 10 0420.

*Primary Examiner*—John J. Love
*Assistant Examiner*—Kenneth R. Rice
*Attorney, Agent, or Firm*—Parkhurst & Oliff

[57] ABSTRACT

According to the present invention, as soon as the sporadic protrusion or sinking of a road surface is detected at the front wheel of the vehicle during its running on the road surface, the air chambers of the air suspensions for the right and the left rear wheels of the vehicle are connected to each other to alter the spring constant of the rear suspensions to 'soft' when the rear wheel passes over the sporadic protrusion or sinking of the road surface, so that the feel of ride of the vehicle and the controllability and stability thereof are kept good. After the rear wheel moves over the sporadic protrusion or sinking, the characteristic of the rear suspensions is returned to the original state appropriate to the normal running state of the vehicle. Detectors for the sporadic protrusion or sinking of the road surface may be provided for the right and the left front wheels of the vehicle, respectively. The rear suspensions of the vehicle can be more appropriately controlled by that.

9 Claims, 13 Drawing Figures

REAR SUSPENSION CONTROLLER

BACKGROUND OF THE INVENTION

The present invention relates to a rear suspension controller for a vehicle, particularly to a rear suspension controller which is effective against a sporadic shock caused by a protrusion or sinking of a road surface on which an automobile is running.

Conventionally, the spring constant or damping force of each of various kinds of suspension components provided between the body and wheels of a vehicle is altered under control depending on the condition of the road surface or the running condition of the vehicle to prevent the vehicle from being shocked or vibrated or keep the controllablity and the stability of the vehicle good. For example, altering the spring constant of the air spring of a suspension depending on the condition of the road surface was proposed in the published unexamined Japanese patent applications Nos. Sho-59-23712 and Sho-59-26638. In such control, the characteristic of the suspension is altered when the running of the vehicle on a rough part of the road surface is detected by a vehicle height sensor or when it is found out by a brake sensor or an accelerator sensor that the front of the vehicle has gone up or down, to keep the controllability and the stability of the vehicle good during its running on the rough part of the road surface or to prevent the front of the vehicle from going up or down further. In the above-mentioned conventional control, only when a continuous large turbulence is detected by the vehicle height sensor, the vehicle is judged to be running on the rough part of the road surface, so that the spring constants of the suspensions for all the wheels of the vehicle are increased to produce a desired effect. However, when the vehicle passes over such sporadic protrusion or sinking of the road surface as a joint of the road patches, the vehicle receives only a sporadic shock and then resumes running on a flat part of the road surface, so that the characteristic of each suspension is not altered. For that reason, in running over such sporadic protrusion or sinking, the passengers of the vehicle are not protected from an unpleasant shock, so that the feel of ride of the vehicle is deteriorated.

SUMMARY OF THE INVENTION

The first object of the present invention is to give a comfortable feel of ride to the passangers of a vehicle provided with gas spring suspension for the right and left rear wheels of the vehicle, and always keep the controllability and the stability of the vehicle good, by appropriately controlling the suspensions for the rear wheels.

The second object of the present invention is to adequately absorb a shock caused by such sporadic protrusion or sinking of a road surface, and give a comfortable feel of ride to the passengers of a vehicle, by altering the characteristics of gas spring suspensions for the rear wheels of the vehicle when the vehicle passes over the sporadic protrusion or sinking.

The third object of the present invention is to alter the characteristic of each of gas spring suspensions of a vehicle to a state appropriate to any condition of the surface of a road, to keep both the feel of ride of the vehicle and the controllability and the stability of the vehicle good, by returning the characteristic of each gas spring suspension to the original unaltered state as soon as the vehicle passes over such sporadic protrusion or sinking of the road surface to maintain the good controllability and stability of the vehicle.

The fourth object of the present invention is to minimize a vibration and a noise which are inevitably caused when a vehicle passes over such sporadic protrusion or sinking of a road surface.

According to the present invention, a rear suspension controller for a vehicle including suspensions having gas chambers for gas springs and provided for the right and left rear wheels of the vehicle includes the following means in order to attain the above-mentioned objects:

(a) a front vehicle height detection means by which a distance between the body and front wheel of the vehicle is detected to generate a front vehicle height signal;

(b) a judgment means by which an absolute value of the front vehicle height signal is compared with a predetermined reference signal to generate a judgment result signal when the absolute value of the front vehicle height signal is greater than the predetermined reference signal;

(c) passages for connecting the gas chambers of the right and left rear suspensions to each other, and means for opening or closing the passages;

(d) a rear suspension characteristic alteration means for performing control to open the open/close means for the passages depending on the judgment result signal.

The front vehicle height detection means may be provided for the right and left front wheels, respectively, to control the rear suspensions as mentioned above, when one of vehicle height signals of the right and left front wheels has exceeded the predetermined reference signal. Other control may be also performed to return the characteristic of each rear suspension to the original unaltered state a predetermined time interval after the characteristic is altered, to enable the vehicle to run with the rear suspension characteristic appropriate to the normal part of the road surface, after the vehicle passes over the sporadic protrusion or sinking of the road surface. The displacement of the current vehicle height from the average vehicle height, the speed of the displacement, the acceleration of the displacement, or the amplitude of the vibration of the displacement may be adopted as the front vehicle height signal. The rear suspension controller may include a means for selecting a condition to put the controller in action only when the vehicle is moving, only when the driver of the vehicle wants to put the controller in action, or the like.

The suspension characteristic is herein referred to as the spring constant of the gas chamber of each air suspension. When the result of judgment by the judgment means indicates that the vehicle height is out of a predetermined range, the open/close means in the passages for connecting the right and the left gas chambers to each other are opened to communicate the gas chambers to each other to vary the spring constants of the rear suspensions.

The actions of the means constituting the rear suspension controller according to the present invention are hereinafter described briefly. When a protrusion or sinking of the road surface is found out by the front vehicle height detection means, the degree of the protrusion or sinking is evaluated by the judgment means. At that time, if the protrusion or sinking is greater enough to be out of a predetermined range, the right and the left rear gas chambers are communicated to each other by the rear suspension characteristic alteration means to make the characteristics of the suspensions 'soft' to improve the feel of ride of the vehicle.

DETAILED DESCRIPTION OF PREFERRED EMBODIMENTS

Figure 1:
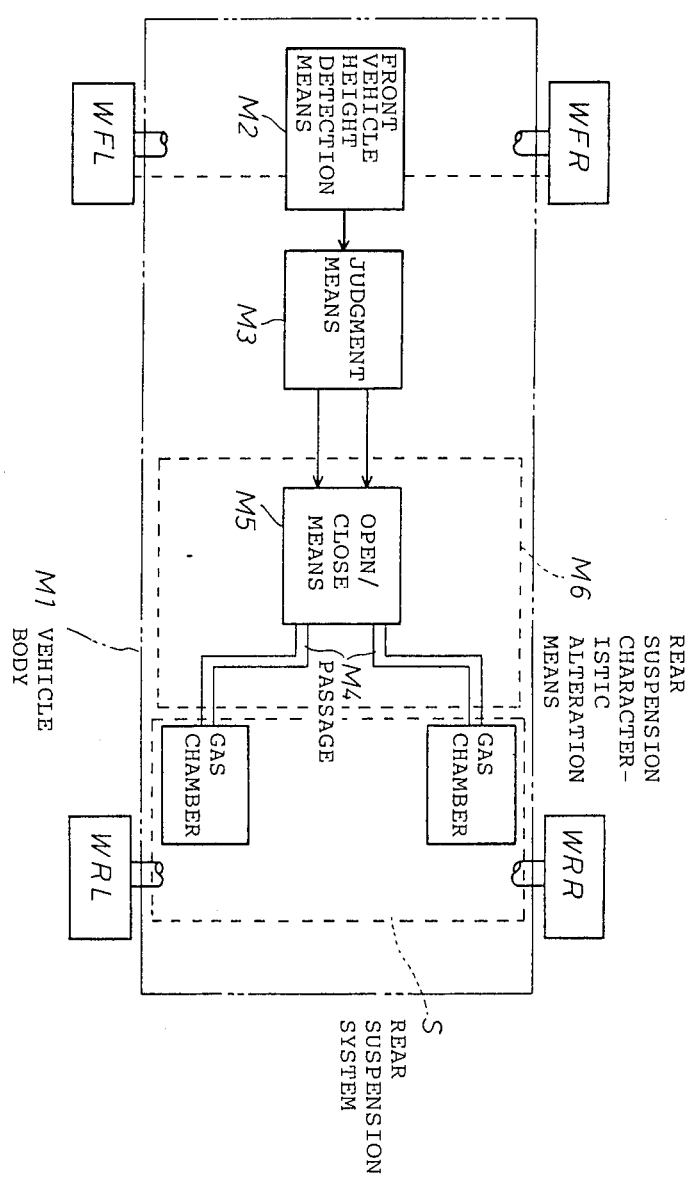
FIG. 1 shows an outline of system of the first embodiment of the present invention.
Figure 2:
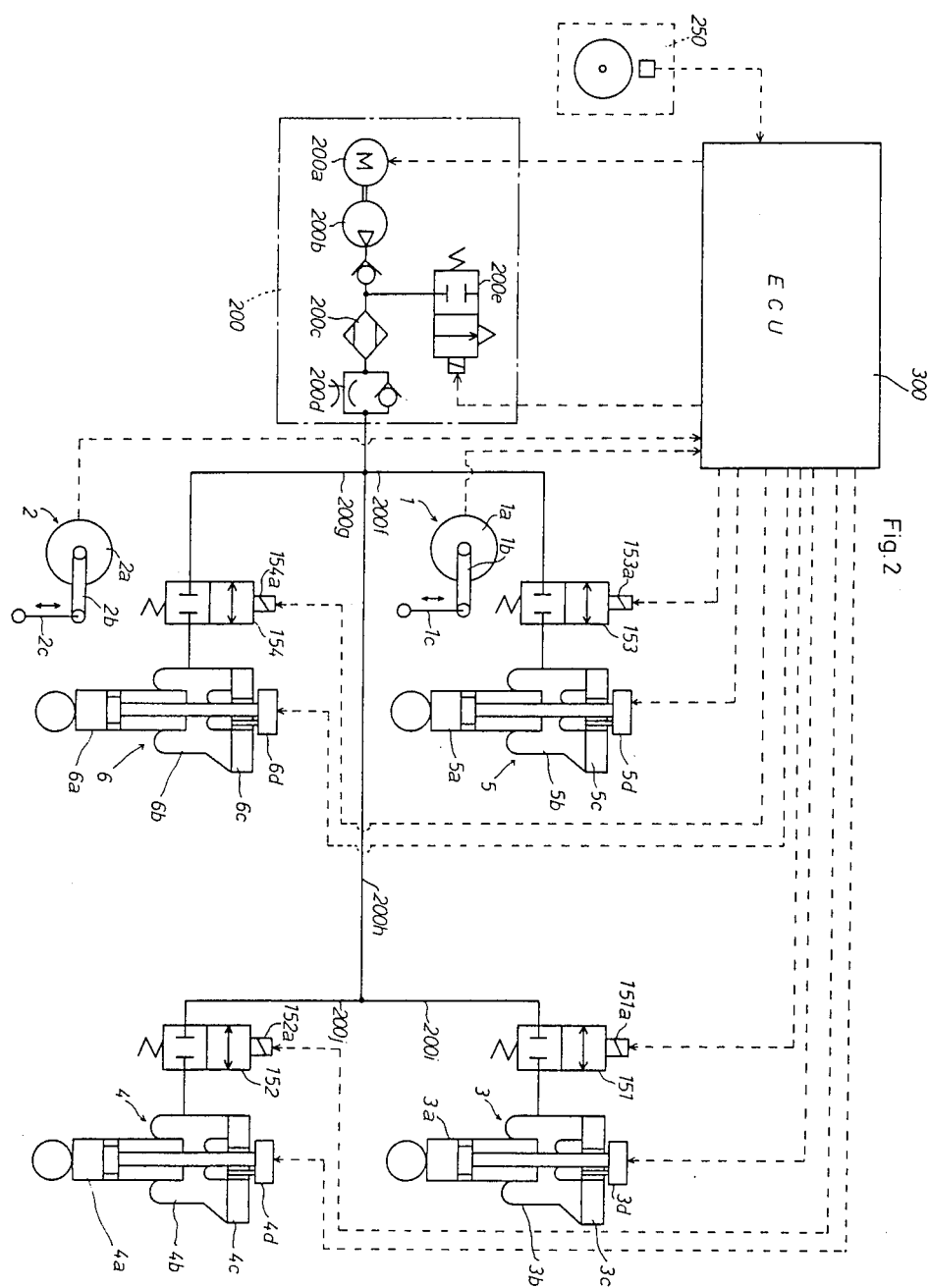
FIG. 2 shows the constitution of the apparatus of the first embodiment.

FIG. 1 shows an outline of system of the first embodiment of the present invention. The body M1 of a vehicle is provided with a front vehicle height detection means M2 to detect a vertical displacement of the right front wheel WFR and the left front wheel WFL of the vehicle to generate a front vehicle height signal and send it to a judgment means M3. The front vehicle height signal is compared with a predetermined reference signal by the judgment means M3 to send a judgment result signal to a rear suspension characteristic alteration means M6 when an absolute value of the front vehicle height signal is greater than the predetermined reference signal. The rear suspension characteristic alteration means M6 includes an open/close means M5 for opening or closing passages M4, which are for connecting a gas chamber G1 for the right rear wheel WRR and a gas chamber G2 for the left rear wheel WRL to each other. The gas chambers constitute a rear suspension system S. When the judgment result signal is received by the rear suspension characteristic alteration means M6, the open/close means M5 is put in an open state by the alteration means M6 to open the passages M4 to communicate the right and the left gas chambers to each other to decrease the spring constant of the rear suspension system S. The first embodiment is hereinafter described in detail. FIG. 2 shows the constitution of apparatuses of this embodiment. A right front vehicle height sensor 1 is provided between the right front wheel WFR and body M1 of the automobile, to detect the distance between the vehicle body M1 and a right suspension arm which follows the motion of the wheel. A left front vehicle height sensor 2 is provided between the left front wheel WFL and the vehicle body M1 of the vehicle to detect the distance between the vehicle body M1 and a left suspension arm. The short cylindrical bodies 1a and 2a of the vehicle height sensors 1 and 2 are secured on the vehicle body M1. Links 1b and 2b extend from the center shafts of the sensor bodies 1a and 2a almost perpendicularly to the center shafts. Turnbuckles 1c and 2c are rotatably attached to the ends of the links 1b and 2b opposite the center shafts of the sensor bodies 1a and 2a, and rotatably attached to portions of the suspension arms opposite the links 1b and 2b. A potensiometer, whose electric resistance changes depending on the rotation of the center shaft of each of the vehicle height sensors 1 and 2 to produce a voltage as the vehicle height, is built in the body of each vehicle height sensor. Though the vehicle height sensors of the above-mentioned type are used in this embodiment, vehicle height sensors of such other type may be also used in the embodiment that plural light interrupters are provided in the body of each vehicle height sensor and are turned on or off depending on the change in the vehicle height by a disk having a slit coaxial to the center shaft of the sensor, to detect the vehicle height.

A suspension of the air spring type is provided between the vehicle body M1 and the suspension arm (not shown in the drawings) for the right rear wheel WRR, and extends in parallel with a suspension spring (not shown in the drawings). The air suspension 3 includes a shock absorber 3a, a main air chamber 3c, an auxiliary air chamber 3c, and an actuator 3d, in the main, and has a spring function, a vehicle height adjustment function and shock absorbing function. The same air suspensions 4, 5 and 6 are provided for the left rear wheel WRL, the right front wheel WFR and the left front wheel WFL, respectively.

Figure 3A:
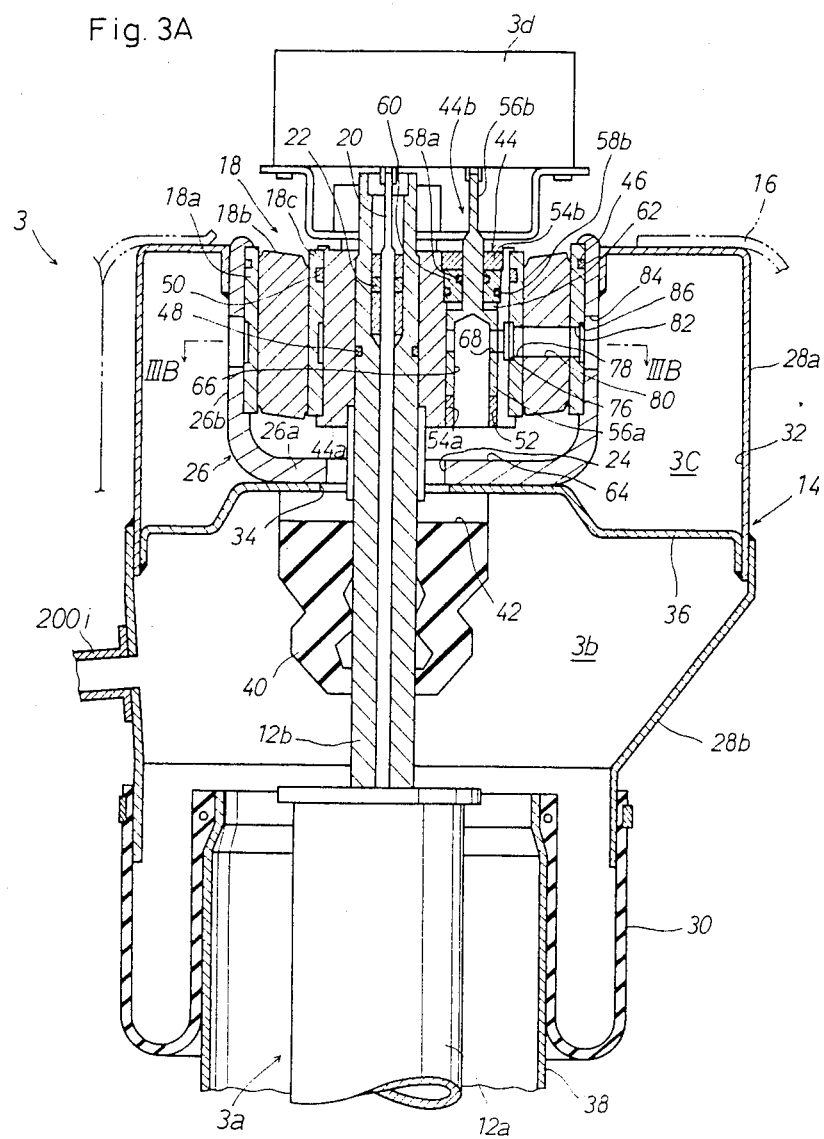
FIGS. 3(A) and 3(B) show sectional views of the main part of an air suspension.
Figure 3B:
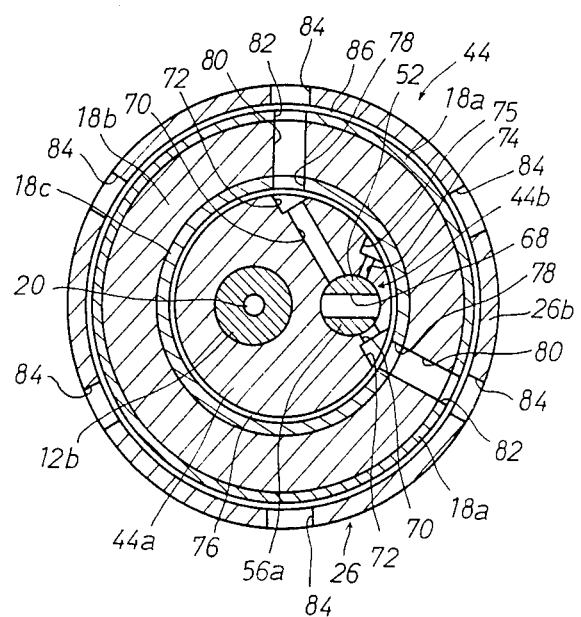

FIGS. 3(A) and 3(B) show the construction of the main part of the air suspension 3. The other air suspension 4, 5 and 6 have all the same construction as the air suspension 3. The air suspension 3 includes the conventional shock absorber 3a composed of a piston and a cylinder, and an air spring unit 14 provided in conjunction with the shock absorber 3a, as show in FIG. 3(A). An axle (not show in the drawings) is supported at the lower end of the cylinder 12a of the shock absorber 3a. A piston rod 12b extends from the piston (not shown in the drawings) slidably fitted in the cylinder 12a. A cylindrical elastic assembly 18 for elastically supporting the piston rod 12b to the vehicle body M1 is provided at the upper end of the piston rod 12b. The shock absorber 3a is a variable-damping-force shock absorber whose damping force can be adjusted by operating the valve function of the piston. A control rod 20 for adjusting the damping force of the shock absorber 3a is liquid-tightly and rotatably fitted with a sealing member in the piston rod 12b.

The air spring unit 14 has a chamber 32 which is defined by a circumferential member 26 including a bottom 26a having an opening 24, through which the piston rod 12b is allowed to extend, and a wall 26b rising from the peripheral portion of the bottom 26a, an upper housing member 28a covering the circumferential member 26 and secured on the vehicle body M1, a lower housing member 28b open at the lower end and coupled to the upper end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a of the member 26. The air chambers 3b and 3c are filled with compressed air. The partition member 36 is provided with a conventional buffer rubber 40 which can be brought into contact with the upper end of the cylinder 12a and has a passage 42 for connecting the openings 24 and 34 to the main air chamber 3b.

The cylindrical elastic assembly 18 is provided inside the circumferential member 26 whose wall 26b defines the circumferential inside of the auxiliary air chamber 3c. The assembly 18 surrounds the piston rod 12b, and is fitted with a valve unit 44 for controlling the communication of the air chambers 3b and 3c. The cylindrical assembly 18 includes an outer cylinder 18a, a cylindrical elastic body 18b and an inner cylinder 18c which are disposed concentrically to each other. The cylindrical elastic body 18b is secured on both the cylinders 18a and 18b. The outer cylinder 18a of the assembly 18 is press-fitted in the wall 26b of the circumferential member 26 secured to the vehicle body M1 through the action of the upper housing member 28a. The valve casing 44a of the valve unit 44, through which the piston rod 12b is allowed to extend, is secured on the inner cylinder 18c. The piston rod 12b is secured on the valve casing 44a. As a result, the piston rod 12b is elastically supported to the vehicle body M1 by the cylindrical elastic assembly 18. An annular air sealing member 46 is tightly packed in between the outer cylinder 18a and the wall 26b. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 open at both the ends and extending in parallel with the piston rod 12b. A rotary valve 44b is rotatably housed in the hole 52. The rotary valve 44b includes a main portion 56a, which can be brought into contact with a lower positioning ring 54a provided at the lower end of the hole 52, and a small-diameter operating portion 56b projecting up from the main portion 56a above the cylindrical elastic assembly 18. An upper positioning ring 54b, which cooperates with the lower positioning ring 54a to prevent the rotary valve 44b from dropping out of the hole 52, is provided at the upper end of the hole 52. An annular sealing base 60 holding an outer air sealing member 58b and an inner air sealing member 58a, which are for tightly closing the hole 52, is provided between the upper positioning ring 54b, and the main portion 56a. A friction reducer 62, which is for smoothing the rotative motion of the rotary valve 44b when the main portion 56a of the valve is pushed on the sealing base 60 by air pressure, is provided between the sealing base and the main portion 56a of the rotary valve.

The lower portion of the cylindrical elastic assembly 18 has a chamber 64, which communicates with the main air chamber 3b through the openings 24 and 34 and the passage 42 of the buffer rubber 40. The main portion 56a of the rotary valve 44b has a recess 66 open to the chamber 64. The main portion 56a has a communication passage 68 extending through the main portion in a diametral direction thereof across the recess 66.

The valve casing 44a, which houses the valve 44b, has a pair of air passages 70, each of which can communicate at one end with the communication passage 68, as shown in FIG. 3(B). The air passages 70 extend outwards on almost the same plane in the diametral direction of the hole 52, toward the peripheral surface of the rotary valve 44b. The outer ends of the air passages 70 are open to the peripheral surface of the valve casing 44a through face holes 72. An air passage 74, which can communicate at one end with the communication passage 68, extending almost the same plane as the air passages 70 toward the peripheral surface of the valve casing 44a, between the pair of air passages 70 outside the hole 52. The diameter of the air passage 74 is smaller than that of the air passages 70. The other end of the air passage 74 is open to the peripheral surface of the valve casing 44a through a face hole 75, The internal circumferential surface of the inner cylinder 18c, which surrounds the peripheral surface of the valve casing 44a, has an annular recess 76 which surrounds the peripheral surface of the valve casing 44a to connect the face holes 52 and 75 for the air passages 70 and 74 to each other.

The inner cylinder 18c has openings 78, which extends to the recess 76 which constitutes an annular air passage. The cylindrical elastic member 18 has through holes 80 which correspond to the openings 78 and extend outwards in the radial direction of the elastic member 18b. The through holes 80 are open to the peripheral surface of the outer cylinder 18a through the openings 82 of the outer cylinder 18a. As a result, the openings 78 and 82 and the through holes 80 constitute an air passage corresponding to the air passages 70 and extending through the cylindrical elastic assembly 18.

The wall 26b of the circumferential member 26 surrounding the outer cylinder 18a has plural openings 84, which are located in equiangular positions in the circumferential direction and extend to the auxiliary air chamber 3c to connect the openings 78 and 82 and the through holes 80 to the auxiliary air chamber. The peripheral surface of the outer cylinder 18a has an annular recess 86, which surrounds the outer cylinder at the openings 82. The openings 84 extend to the recess 86 which constitutes an annular air passage.

Though the openings 78 and 82 and the through holes 80 are provided to correspond to the two air passages 70 of the valve casing 44a, the annular air passage 76 can be provided in an optional position in the diametral direction of the elastic member 18b because the air passage 76, with which the air passage 70 and 74 communicate, extends between the inner cylinder 18c and the valve casing 44a as shown in FIG. 3(B).

The control rod 20 for adjusting the damping force of the shock absorber 3a, and a conventional actuator 3d for rotating the rotary valve 44b of the valve unit 44, are provided at the upper end of the piston rod 12b, as shown in FIG. 3(A).

Since the air suspension 3 has the above-mentioned construction, the air suspension performs actions described hereinafter. When the rotary valve 44b is kept in such a closed position shown in FIG. 3(B) that the communication passage 68 of the rotary valve 44b communicates none of the air passages 70 and 74 of the valve casing 44a, the main air chamber 3b and the auxiliary air chamber 3c are discommunicated from each other so that the spring constant of the suspension 3 is set at a large value. When the rotary valve 44 is rotated into such a position by the actuator 3d that the communication passage 68 of the rotary valve communicates with the large-diameter air passages 70 of the valve casing 44a, the main air chamber 3b is communicated to the auxiliary air chamber 3c through the communication passage 68 communicating with the main air chamber, the large-diameter air passages 70, the openings 78, through holes 80 and openings 82 of the elastic assembly 18 and the openings 84, so that the spring constant of the suspension 3 is set at a small value.

Leveling valves 151-154 are provided for the air suspensions 3-6, respectively, as shown in FIG. 2. A compressed air feed and discharge system 200 is communicated to the main air chambers 3b-6b of the air suspensions 3-6 through passages 200f-200j or discommunicated from the main air chambers, by the leveling valves 151-154, depending on whether or not electricity is applied to solenoids 151a-154a. When the leveling valves 151-154 are opened, compressed air can be fed to or discharged from the air suspensions 3-6. When the compressed air is fed to the air suspensions, the height of the vehicle is increased. When the compressed air is discharged from the air suspensions, the height of the vehicle is decreased. When the leveling valves 151-154 are closed, the height of the vehicle is maintained. When the leveling valves 151 and 152 are opened, the main air chambers 3b and 4b for the right and left rear wheels of the vehicle are communicated to each other through the passages 200i and 200j.

In the compressed air feed an discharge system 200, a compressor 200b is driven by a motor 200a to produce the compressed air. An air drier 200c dries the compressed air to be fed to the air suspensions 3-6, to protect pipes and the components of the air suspensions from moisture and prevent a pressure abnormality due to a moisture phase change in the main air chambers 3b-6b and auxiliary air chambers 3c-6c of the air suspensions 3-6. When the compressed air is fed to the air suspensions, a check valve 200d provided with a fixed orifice is opened. When the compressed air is discharged from the air suspensions, the check valve is closed so that the air is discharged through only the fixed orifice. When the compressed air is discharged from the air suspensions 3-6, a releasing solenoid valve 200e is driven so that the compressed air discharged from the air suspensions through the fixed orifice and the air drier 200c is released into the atmosphere. The solenoid valve 200e can be controlled to change the volumes of the main air chambers 3b-6b of the air suspensions 3-6 to adjust the height of the vehicle.

A vehicle speed sensor 250 is provided in a speedometer, for example, to send out a pulse signal corresponding to the speed of the vehicle, in response to the motion of the axle of the vehicle.

Figure 4:
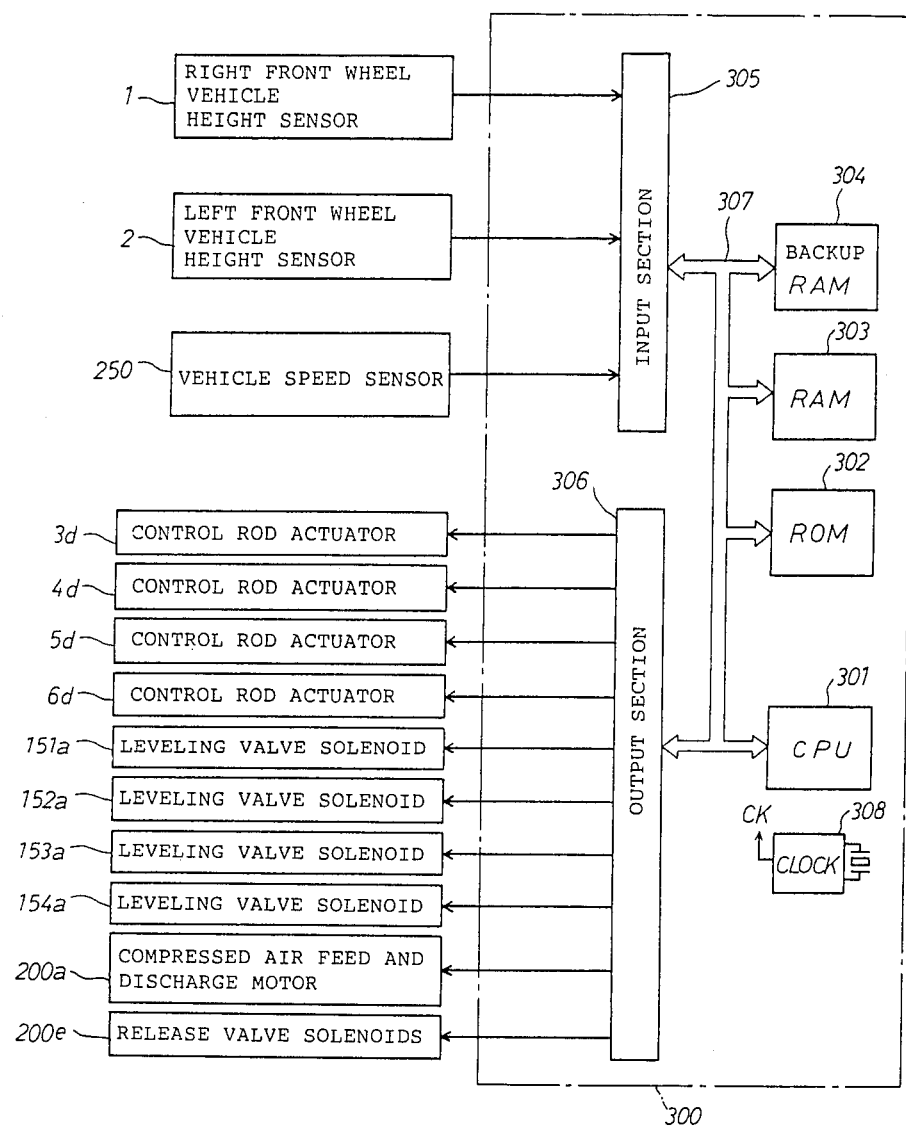
FIG. 4 shows the constitution of an electronic control unit (ECU).

The output signals of the vehicle height sensors 1 and 2 and the vehicle speed sensor 250 are entered into an electronic control unit (hereinafter referred as ECU) 300, which processes the data of the signals to send out drive signals to the actuators 3d-6d of the air suspensions 3-6, the leveling valves 151-154, the motor 200a of the compressed air feed and discharge system 200 and the solenoid valve 200e to perform appropriate control if necessary. FIG. 4 shows the construction of the ECU 300. A central processing unit (hereinafter referred to as CPU 301) receives the output data from the sensors and performs operations on the data, in accordance with a control program, and performs processing steps for the operation, control or the like of various devices. The control program and initial data are stored in a read-only memory (hereinafter referred to as ROM) 302. Data which are entered into the ECU 300, and data which are necessary to control operations are written into or read from a random-access memory (hereinafter referred to as RAM) 303. A backup random-access memory (hereinafter referred to as backup RAM) 304 is backed up by a battery to retain necessary data still after the ignition key switch of the vehicle is turned off. An input section 305 includes an input port (not shown in the drawings), a wave shaping circuit provided if necessary, a multiplexer which selectively sends out the output signals of the sensors to the CPU 301, and an A/D converter which changes an analog signal into a digital one. An output section 306 includes an output port (not shown in the drawings), and a drive circuit for driving each actuator according to a control signal from the CPU 301 as occasion demands. A bus 307 connects the circuit components such as the CPU 301 and the ROM 302, the input section 305 and the output section 306 to each other to transmit data. A clock circuit 308 sends out a clock signal at preset intervals to the CPU 301, the ROM 302, the RAM 303 and so forth to set a control timing.

Figure 5A:
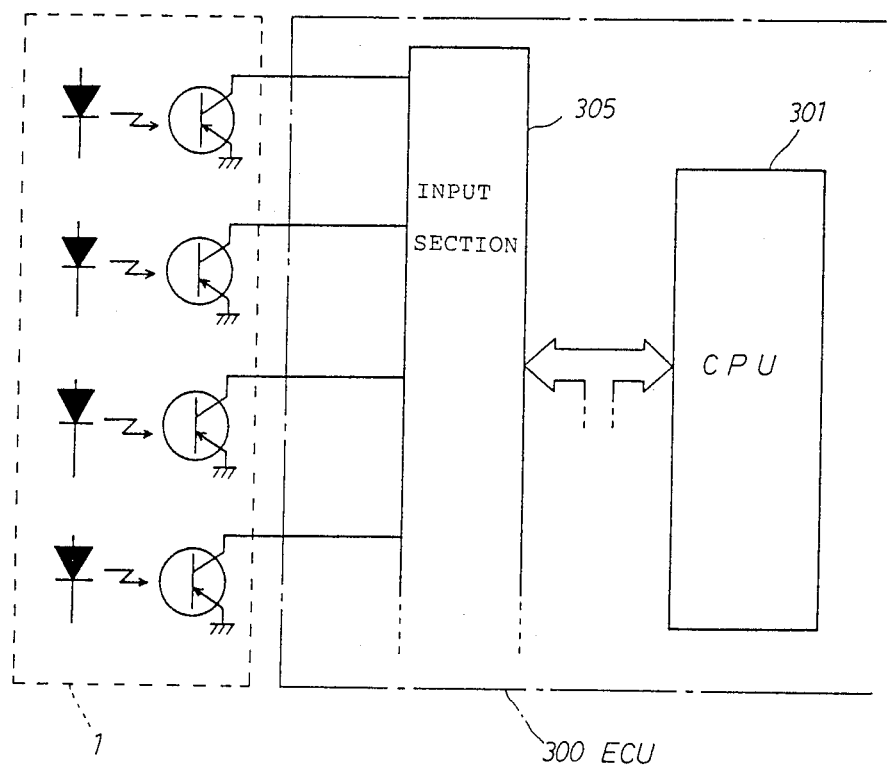
FIG. 5(A) shows the construction of an input section which receives a front vehicle height digital signal.
Figure 5B:
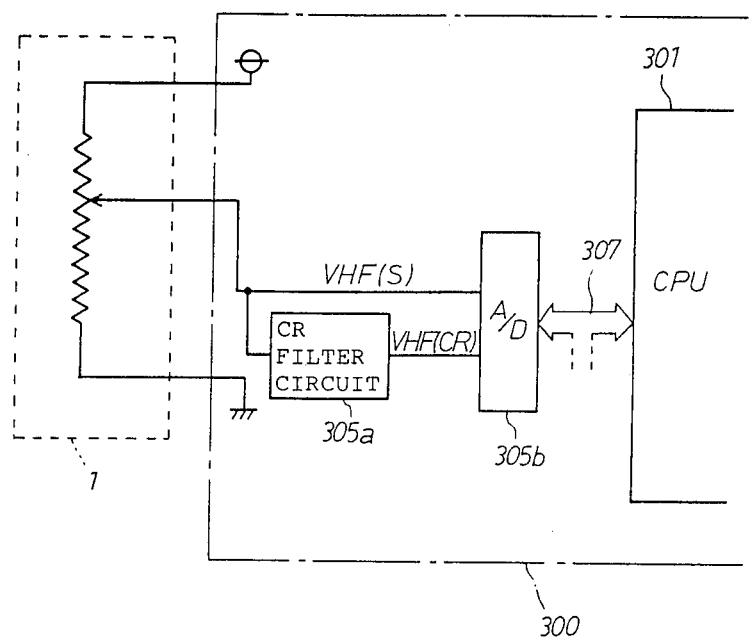
FIG. 5(B) shows the construction of an input section which receives a front vehicle height analog signal.

If the right front vehicle height sensor 1 sends out a digital signal, the signal is transmitted to the CPU 301 through the input section 305 including a buffer as shown in FIG. 5(A). If the vehicle height sensor 1 sends out an analog signal, a construction as shown in FIG. 5(B) is provided. In the latter case, the vehicle height sensor 1 sends out the signal of an analog voltage corresponding to the height of the vehicle. The analog-voltage signal is converted into a voltage signal VHF(CR) indicating the average height of the vehicle, by a CR filter circuit 305a. The voltage signal VHF(CR) is applied to an A/D converter 305b. The analog-voltage signal is also applied as a voltage signal VHF(S) indicating the current height of the vehicle, directly to the A/C converter 305b. The converter 305b changes both the input signals into digital signals through the action of a muptiplexer. The digital signals are transmitted to the CPU 301. The same things applies to the left front wheel vehicle height sensor 2.

The processing steps, which are performed by the ECU 300, are hereinafter described referring to a flow chart shown in FIG. 6. The flow chart indicates the processing steps which are performed by the ECU 300 in response to the vehicle height sensors of such a linear type shown in FIG. 5(B) that the sensors send out analog signals. The processing steps are repeatedly performed in every predetermined time interval such as 5 msec. An outline of the processing steps shown in the flow chart is as follows:

(1) A current vehicle height VHF(S) and an average vehicle height VHF(CR) are determined first (Steps 540 and 550).

(2) It is judged whether or not the displacement of the current vehicle height from the average vehicle height has exceeded a predetermined value h0 (Step 580).

(3) If the displacement is judged to have exceeded the predetermined value h0, the characteristic of the rear suspensions is altered to deal with the protrusion or sinking of the road surface (step 620). At that time, the characteristic of the suspensions is made 'soft', in other word, the leveling valves 151 and 152 are opened to communicate the main air chambers 3b and 4b of the right and the left rear air suspensions to each other to decrease the spring constants of the air springs of the suspensions.

The above-mentioned items (1), (2) and (3) are the main processing steps for producing the effect of the present invention through this embodiment. In the embodiment, the following item is also performed:

(4) After the items (3), the main air chambers 3b and 4b for the right and left rear wheels are discommunicated from each other to return the characteristic of the rear suspensions to the original state after the rear wheel passes over the protrusion or sinking of the road surface (Step 660).

The processing steps shown in the flow chart are hereinafter described in detail. The processing steps are repeatedly performed every 5 msec. It is judged whether or not the processing steps are being performed for the first time since the activation of the ECU 300 (Step 510). If the processing steps are judged to be being performed for the first time, initial setting is carried out (Step 520), all variables are cleared and all flags are reset. After the initial setting is carried out (Step 520) or if the processing steps in the routine are being performed for the second time or later, the vehicle speed V is detected (Step 530) in terms of the output signal of the vehicle speed sensor 250. A current vehicle height signal VHF(S) is detected (Step 540). Either of the output signals of the vehicle height sensors for the right and the left front wheels of the vehicle may be used as the current vehicle height signal. Since rear wheels receive a shock whichever of the front wheels moves up on the protrusion of the road surface or moves down into the sinking thereof, either the average value of both the vehicle height signals of the front vehicle height sensors 1 and 2 or the higher one of both the vehicle height signals may be used.

An average of the past valves of the output signal of the vehicle height sensor 1 is determined to set an average vehicle height (Step 550). In this embodiment, the average is directly determined as an average vehicle height signal VHF(CR) from the output signal of the vehicle height sensor 1 through the CR filter circuit 305a which is a low-pass filter shown in FIG. 5(B). If the vehicle height sensor 1 sends out a digital signal, the values of the vehicle height signal VHF(S) measured in the ECU 300 in the past may be used to calculate the average. For example, processing steps shown in FIG. 7 may be performed instead of those in Steps 540 and 550 shown in FIG. 6, to calculate the average. In the processing steps shown in FIG. 7, a current vehicle height signal VHF(S)n is detected first, and an average VHFa,n is then calculated (Steps 730 and 740) in every predetermined operation unit time interval tms (Step 720). In Step 730, the following calculation is performed:

$$VHFa,n = \{(k-1)VHFa,n-1 + VHFb,n-1 + VHF(S)n\}/k$$

k: Number of measured values to be averaged
VHFa,n: Average to be calculated currently (n−th time)
VHFa,n−1: Average calculated previously ((n−1)−th time)
VHF(S)n: Measured value of current vehicle height
VHFb,n−1: Value calculated previously for convenience to calculate the average VHFa,n In Step 740, VHFb,n is calculated as follows:

$$VHFb,n - mod(k)\{(k-1)VHFa,n-1 + VHFb,n-1 + VHF(S)n\}$$

In such calculation, mod(A){B} means the value of the remainder in the division of B by A. The processing steps in Steps 730 and 740 constitute such a simple method of determining an average that if only VHFa,n, VHFa,n−1 and VHFb,n−1 are stored in a memory beforehand, a value approximate to the average can be calculated. Since past (k−1) pieces of data do not need to be stored in the simple method, the space of the memory and the time of the calculation are saved. If the space of the memory and the time of the calculation are enough for use, a required number of measured values may be averaged normally.

After the average vehicle height signal is detected (Step 550), it is judged whether or not the control of the suspension is in an automatic mode (Step 560). If the driver of the vehicle has not selected the automatic mode with a manual switch, the routine is terminated. If the driver has selected the automatic mode, it is then judged whether or not the vehicle is moving (Step 570). When the detected output of the vehicle speed sensor 250 is not lower than a predetermined value, the vehicle is judged to be moving. In that case, it is judged whether or not the absolute value of the difference between the current vehicle height signal VHF(S) and the average vehicle height signal VHF(CR), namely, the displacement |VHF(S)−VHF(CR)| of the current vehicle height signal VHF(S) from the average vehicle height signal VHF(CR) has exceeded a predetermined reference value h0 (Step 580). If the change is judged to be not greater than the value h0, a flag Fh is reset (Step 590). The flag Fh is for judging whether or not the processing steps are being performed for the first time since the displacement exceeded the value h0.

Figure 8:
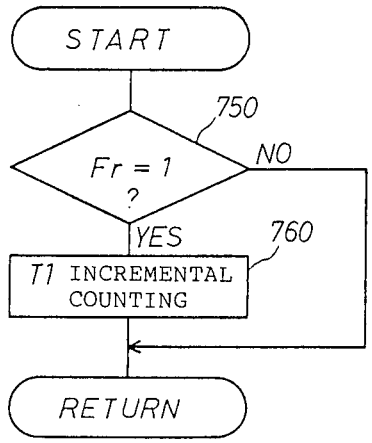
FIG. 8 shows a flow chart of processing steps which are performed in the ECU of the first embodiment and correspond to the incremental counting of the timer.

It is judged whether or not the height of the vehicle is being adjusted. If the vehicle height is judged to be being adjusted, a flag Fa is set (Steps 602 and 604). The flag Fa is for stopping the adjustment of the vehicle height. If the vehicle height is judged to be being adjusted, the adjustment is stopped (Step 606) and next Step is taken. This processing step is performed in order to prevent the compressed air from being fed to the main air chambers 3b and 4b for the right and left rear wheels to abruptly make the characteristics of the suspensions 'hard' when the main air chambers are communicated to the compressed air feed and discharge system 200 as the vehicle height at the front wheel is being adjusted. Step 610 is taken to start a timer T1 and set the flags Fh and Fr. The timer T1 is for counting up the time for which the characteristic of the rear suspensions is kept altered. The flag Fr is for judging whether or not the timer T1 should be counting, as shown in FIG. 8 which indicates a flow chart of a routine which is repeatedly executed in every predetermined time interval. If the flag Fr is already ste (Step 750), the timer T1 is caused to perform incremental counting (step 760).

After Step 610, the characteristic of the rear suspensions is altered (Step 620). At that time, the main air chambers 3 and 4 are communicated to each other in accordance with an output signal from the CPU 301 to the leveling valves 151 and 152 to alter the characteristic of the rear suspensions to 'soft' (small spring constant) to absorb a shock at each rear wheel. If the right and the left rear wheels simultaneously receive shocks due to protrubions or sinkings of the same form, the characteristics of the air springs are not made 'soft' when the main air chambers 3b and 4b are communicated to each other. However, since the rear wheels seldom receive such shocks from the road surface simultaneously, the characteristic of the rear suspensions can be usually made 'soft' in most cases. After the characteristic of the rear suspensions is altered (Step 620), the time interval Tv from the time point of the detection of the protrusion or sinking at the front wheel to that of the passing of the rear wheel over the protrusion or sinking is calculated on the basis of the vehicle speed V, in accordance with the following formula (Step 630):

$$Tv = (A1/V) + A2$$

A1: Wheelbase
A2: Compensatory term (constant)

The compensatory term A2 is determined in consideration of the detection lags of the vehicle height sensors 1 and 2, the time taken for the rear wheel to move over the protrusion or sinking, and so forth.

It is judged (Step 640) through comparison with the count of the timer T1 whether or not the time interval Tv calculated in Step 630 has elapsed since the characteristic of the rear suspensions has been altered. If the count of the timer T1 is judged to be not greater than the time interval Tv, the processing steps in the routine are terminated as they are. If the count of the timer T1 is judged to have exceeded the time interval Tv, in other words, if the time interval Tv is judged to have elapsed since the rear wheel suspension characteristic was altered to be appropriate to the protrusion or sinking of the road surface, the timer T1 is reset and the flag Fr is also reset (Step 650). For that reason, 'NO' is taken in Step 750 for a processing step for the incremental counting of the timer T1 as shown in FIG. 8, in the set state of the flag Fr, so that the incremental counting of the timer T1 is stopped.

Finally, a processing step for returning the characteristic of the rear suspensions to the original state is performed (Step 660). At that time, the mutually communicated main air chambers 3b and 4b of the air suspensions 3 and 4 for the right and the left rear wheels are discommunicated from each other by closing the leveling valves 151 and 152.

Thus, when the protrusion or sinking of the road surface is detected at the front wheel, the characteristic of the rear suspensions is altered to prevent the rear portion of the vehicle from being shocked, to improve the feel of ride of the vehicle. When the vehicle has passed over the protrusion or sinking, the rear suspension characteristic is returned to the original state.

Figure 9:
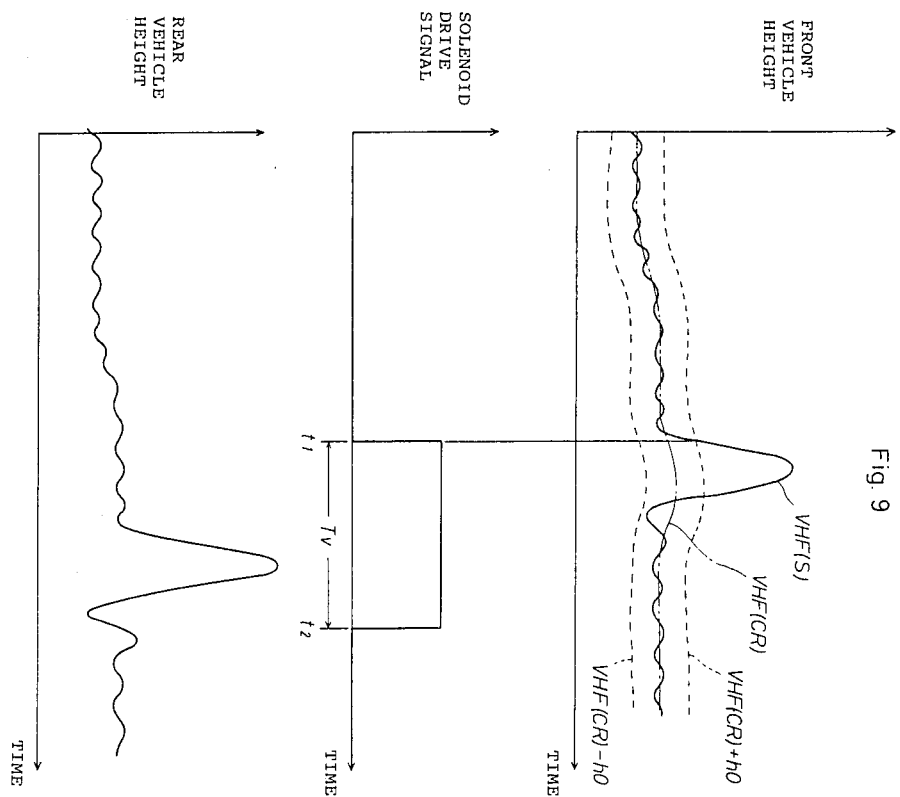
FIG. 9 shows time charts of the processing steps which are performed in the ECU of the first embodiment.

FIG. 9 shows time charts of the above-mentioned processing steps. FIG. 9 indicates that the automobile is running on a flat surface of a road before a time point t1. The vehicle height signal VHF(S) obtained from the vehicle height sensors 1 and 2 draws waves of small amplitude. The average vehicle height signal VHF(CR) obtained from the CR filter circuit 305a draws a smoothed form of the waves. When the front wheel of the vehicle has begun to move down into the sinking of the road surface, the vehicle height signal VHF(S) sharply increases, and exceeds VHF(CR)+h0 at the time point t1. In that case, a relation |VHF(S)−VHF(CR)|>h0 is judged to exist in Step 580 of the flow chart shown in FIG. 6. From the time point t1, the ECU 300 sends out a drive signal to the solenoids 151a and 152a to drive the leveling valves 151 and 152 for the rear air suspensions 3 and 4. The main air chambers 3b and 4b for the right and the left rear suspensions are kept communicated to each other while the drive signal is being output from the ECU 300. At a time point t2 which is by the time interval Tv later than the time point t1, the output of the drive signal is stopped to close the leveling valves 151 and 152. Between the time points t1 and t2, the rear wheel moves down into the sinking detected at the front wheel. If different drive signals for opening and closing the solenoids 151a and 152a are output, the opening drive signal is output at the time point t1 and the closing drive signal is at the time point t2.

When the front wheel moves up on the protrusion of the road surface, the vehicle height has the deepest trough. When the current vehicle height signal VHF(S) has become smaller than VHF(CR)−h0, the solenoids 151a and 152a are driven, too.

In this embodiment, the main air chambers 3b and 4b are communicated to each other when the rear wheels move down in the sinking of the road surface, to prevent the rear portion of the vehicle from being shocked. For that reason, a vehicle height amplitude at the rear wheel is greater than that of the normal running state.

Since this embodiment has the above-mentioned constitution, the rear portion of the vehicle is prevented from being shocked. Since the possible shocking of each rear wheel would impart an unpleasant vibration not only to the rear seat of the vehicle but also its front seat, the absorption of the possible shocking of each rear wheel results in preventing vehicle from being shocked, to improve the feel of ride of the vehicle.

Since the characteristic of the rear suspensions is set with a distinct difference between the normal cruising and rough road running both the controllability and the stability of the vehicle and the feel of ride thereof in the normal cruising of the vehicle are improved. In addition, the degree of freedom of design of the suspension characteristic is increased.

Though it is judged, in this embodiment, whether or not the characteristic of the rear suspensions should be altered depending or whether or not the difference between the current vehicle height signal VHF(S) and the average vehicle height VHF(CR) is out of a range of h0, it may be also judged whether or not the characteristic should be altered, depending on the speed of the displacement of the vehicle height, the acceleration of the displacement or the amplitude of the vibration of the displacement. As for the judgment in terms of the speed or acceleration of the displacement, quick action can be taken because the initial condition of the movement of the front wheel over the protusion or sinking is clarified. The judgment in terms of the amplitude of the vibration of displacement is effective in attaching importance to the controllability and stability in particular.

Figure 10:
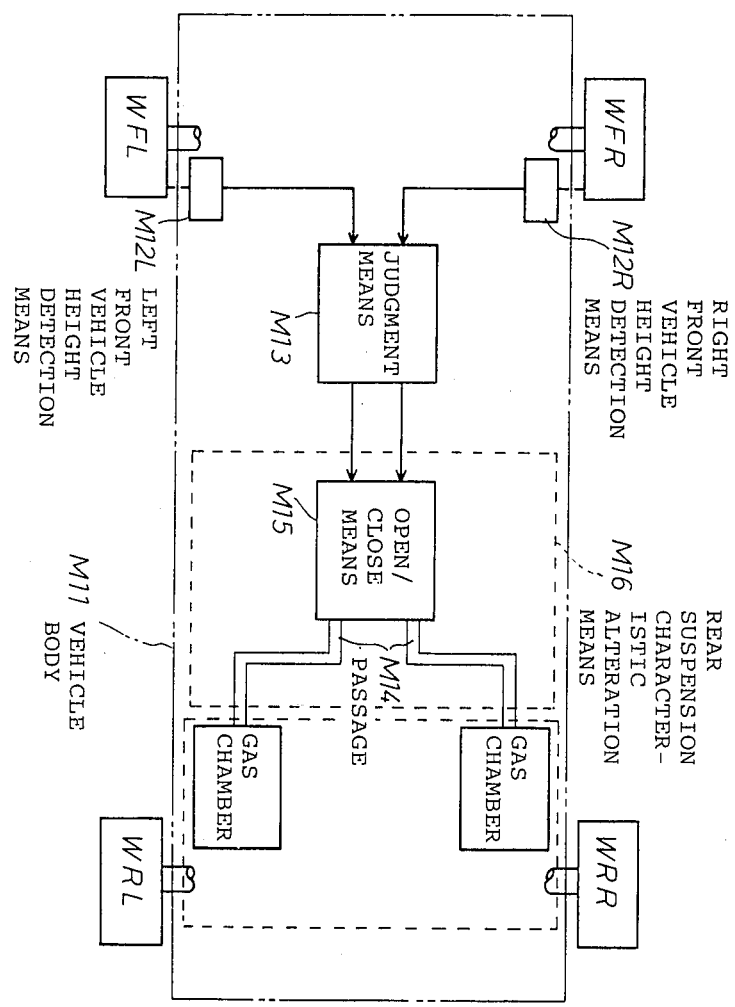
FIG. 10 shows an outline of the constitution of the second embodiment of the present invention.

The second embodiment of the present invention is hereinafter described in detail. FIG. 10 shows an outline of the constitution of the second embodiment. In this embodiment, a right front vehicle height detection means M12R and a left front vehicle height detection means M12L are provided to independently detect the distances between the body M11 of a vehicle and the right and left front wheels WFR and WFL thereof, similer to the front vehicle height detection means M2 of the first embodiment shown in FIG. 1. A right front vehicle height signal and a left front vehicle height signal are compared with predetermined reference signals, respectively, by a judgment means M13 so that a judgment result signal is output to a rear suspension characteristic alteration means M16 when at least one of the right and the left front vehicle height signals has exceeded the reference signal. The rear suspension characteristic alteration means M16 includes passages M14 for connecting the gas chambers of a right and a left rear suspensions to each other, and a means M15 for opening or closing the passages M14, just like the rear suspension characteristic alteration means of the first embodiment, and performs the same actions as that of the first embodiment.

The second embodiment is hereinafter described in detail. The constitution of the apparatuses of the second embodiment is shown in FIG. 2, just like that of the first embodiment. The processing steps which are performed by the ECU 300 of the second embodiment are different from those which are performed by that of the first embodiment. The processing steps are hereinafter described referring to a flow chart shown in FIG. 11. The flow chart indicates the processing steps which are performed by the ECU 300 in response to a vehicle height sensor 1 of such a linear type shown in FIG. 5(B) that the sensor sends out an analog signal. The processing steps shown in the flow chart are repeatedly performed in every predetermined time interval such as 5 msec. An outline of the processing steps is as follows:

(1) Current vehicle heights VHFL(S) and VHFR(S) and average vehicle heights VHFL(CR) and VHFR(CR) are determined first (Steps 840 and 850).

(2) It is judged whether or not the displacement of the current vehicle height at the right front wheel from the average vehicle height has exceeded a predetermined value h0 (Step 880).

(3) It is judged whether or not the displacement of the current vehicle height at the left front wheel from the average vehicle height has exceeded a predetermined value h1 (Step 882).

(4) If the displacement is judged to have exceeded the predetermined value h0 or h1, the characteristic of the rear suspensions is altered to deal with moving over the protrusion or sinking of the road surface (Step 920). At that time, the characteristic of the rear suspensions is made 'soft' in order to prevent the vehicle's rear portion from being shocked. This processing step corresponds to that of the first embodiment in which the leveling valves 151 and 152 are opened to communicate the main air chambers 3b and 4b of the right and the left rear air suspensions 3 and 4 to each other to decrease the spring constants of the air springs.

The above-mentioned items (1), (2), (3) and (4) are the main processing steps for producing the effect of the present invention through the second embodiment. The processing steps described below is also performed in this embodiment.

(5) After the item (4), the main air chambers 3b and 4b for the right and left rear wheels are discommunicated from each other to return the characteristic of the rear suspensions to the original state after the rear wheel moves over the protrusion or sinking of the road surface (Step 960).

The processing steps in the second embodiment are hereinafter described in detail. The processing steps are repeatedly performed in every 5 msec. It is judged whether or not the processing steps are being performed for the first time since the activation of the ECU 300 (Step 810). If the processing steps are judged to be being performed for the first time, initial setting is carried out (Step 820), all variables are cleared and all flags are reset. After the initial setting is carried out or if the processing steps in the routine are judged to be being performed for the second time or later, the vehicle speed V is detected (Step 830) in terms of the output signal of a vehicle speed sensor 250. A current right front vehicle height signal VHFR(S) and a left front vehicle height signal VHFL(S) are then detected (Step 840). The past average of the output signals of the right and the left front wheel vehicle height sensors 1 and 2 is determined to set an average vehicle height (Step 850). In this embodiment, an average vehicle height signal VHFR(CR) is directly obtained from the output signal of the vehicle height sensor 1 through a CR filter circuit 305a which is a low-pass filter and shown in FIG. 5(B). If the vehicle height sensor 1 output a digital signal, the vehicle height signal VHFR(S) measured in the past may be used to calculate the average. This calculation is performed by adopting the same processing steps as described before and shown in FIG. 7, instead of adopting the processing steps in Step 840 and 850 shown in FIG. 11, for both the average vehicle height signals VHFR(CR) and VHFL(CR).

After the detection of the average (Step 850), it is judged whether or not the control of the suspensions is in an automatic mode (Step 860). If the driver of the vehicle has not selected the automatic mode with a manual switch, the processing steps in the routine are terminated. If the driver has instructed the automatic mode, it is then judged whether or not the vehicle is moving (Step 870). The vehicle is judged to be moving, if the detected output of the vehicle speed sensor 250 is not lower than a predetermined value. When the vehicle is judged to be moving, it is judged whether or not the difference between the current vehicle height signal VHFR(S) at the right front wheel and the average vehicle height signal VHFR(CR) namely, the vehicle height displacement |VHFR(S)−VHFR(CR)| has exceeded a predetermined reference value h0 (Step 880). If the displacement is judged to be not greater than the value h0, it is judged whether or not the difference between the current vehicle height signal VHFL(S) at the left front wheel and the average vehicle height signal VHFL(CR), namely, the vehicle height displacement |VHFL(S)−VHFL(CR)| has exceeded a predetermined reference value h1 (Step 882). If the latter displacement is judged to be not greater than the value h1, a flag Fh is reset (Step 890). The flag Fh is for judging whether or not the processing steps are being performed for the first time since the displacement exceeded the value h0 or h1.

It is judged in Step 902 whether or not the height of the vehicle is being adjusted. If the vehicle height is judged to be being adjusted, a flag Fa is set. The flag Fa is for stopping the adjustment of the vehicle height. If the vehicle height is judged to be being adjusted, a processing step for stopping the adjustment of the vehicle height is performed (Step 906), and next step is then taken. This processing step is performed in order to prevent compressed air from being fed to the main air chambers 3b and 4b for the right and the left rear wheels of the vehicle to abruptly make the suspension characteristic 'hard' when the main air chambers are communicated to a compressed air feed and discharge system 200 as the vehicle height at the front wheel is adjusted.

Step 910 is taken to start a timer T1 and set the flags Fr and Fh. The timer T1 is for checking on the time for which the characteristic of the rear wheel suspensions is kept altered. The flag Fr is for judging whether or not the timer T1 should be caused to perform incremental counting, as shown in FIG. 8. After Step 910, the characteristic of the rear wheel suspensions is altered (Step 920). At that time, the main air chambers 3b and 4b of the air suspensions 3 and 4 for the right and the left rear wheels are communicated to each other according to the signal output of the CPU 301 to the leveling valves 151 and 152 to alter the characteristic of each suspension to 'soft' (small spring constant) to absorb a shock at each rear wheel. The spring constants are not decreased to make the characteristics of the rear suspensions 'soft' when both the rear wheels simultaneously receive shocks due to the protrusions or sinkings of identical form as the main air chambers 3b and 4b are communicated to each other. However, since the right and the left wheel seldom simultaneously receive such shocks from the road surface, the characteristic of each rear suspension can be usually made 'soft' in most cases.

After the alteration of each rear suspension (Step 920), the time interval Tv from the time point of the detection of the protrusion or sinking at the front wheel to that of the movement of the rear wheel over the protrusion or sinking is calculated on the basis of the vehicle speed V, in accordance with the following formula (Step 930):

$$Tv = (A1/V) + A2$$

A1: Wheelbase
A2: Compensatory term (constant)

The compensatory term A2 is determined in consideration of the detection lags of the vehicle height sensors 1 and 2, the time taken for the rear wheel to move over the protrusion or sinking, and so forth.

It is judged (Step 940), through comparison with the count of the timer T1 whether or not the time interval Tv determined in Step 930 has elapsed since the characteristic of the rear suspensions was altered. If the count of the timer T1 is judged to be not greater than the time interval Tv, the processing steps in the routine are terminated as they are. If the count of the timer T1 is judged to have exceeded the time interval Tv, in other words, the time interval Tv has elapsed since the characteristic of the rear suspensions is altered to be appropriate to the protrusion or sinking of the road surface, the timer T1 is reset and the flag Fr is also reset (Step 950). For that reason, 'NO' is taken in Step 750 for a processing step for the incremental counting of the timer T1, in the set state of the flag Fr, so that the incremental counting of the timer T1 is stopped.

Finally, a processing step for returning the characteristic of the rear suspensions to the original state is performed (Step 960). At that time, the leveling valves 151 and 152 are closed to discommunicate the mutually-communicated main air chambers 3b and 4b of the right and the left air suspensions 3 and 4 from each other.

Thus, when the protrusion or sinking of the road surface is detected at one of the right and the left front wheels of the vehicle, the characteristic of the rear suspensions is altered to pevent the rear portion of the vehicle from being shocked, to improve the feel of ride of the vehicle when the vehicle has passed over the protrusion or sinking, the altered characteristic of the rear suspensions is returned to the original state.

The above-mentioned processing steps in the second embodiment can be shown in the same manner as those in the first embodiment, by the time charts in FIG. 9, if VHF(S), VHF(CR), VHF(CR)+h0 and VHF(CR)−h0 in FIG. 9 are replaced with VHFR(S) or VHFL(S), VHFR(CR) or VHFL(CR), VHFR(CR)+h0 or VHFL(CR)+h1, and VHFR(CR)−h0 or VHFL−h1, respectively.

It is judged whether or not the characteristic of the suspensions should be altered, depending on whether or not the difference between the current vehicle height signal VHFR(S) and the average vehicle height signal VHFR(CR) has is out of a range of h0 and whether or not the difference between the current vehicle height signal VHFL(S) and the average vehicle height signal VHFL(CR) has gone out of a range of h1, in the second embodiment. It may be also judged whether or not the characteristic should be altered, depending on the speed of the displacement of the current vehicle height from the average vehicle height, the acceleration of the displacement or the amplitude of the vibration of the displacement, just as in the first embodiment.

Since the responding property of the second embodiment to the protrusion or sinking of the road surface is good, the second embodiment is highly effective to improve the feel of ride of the vehicle.

Figure 6:
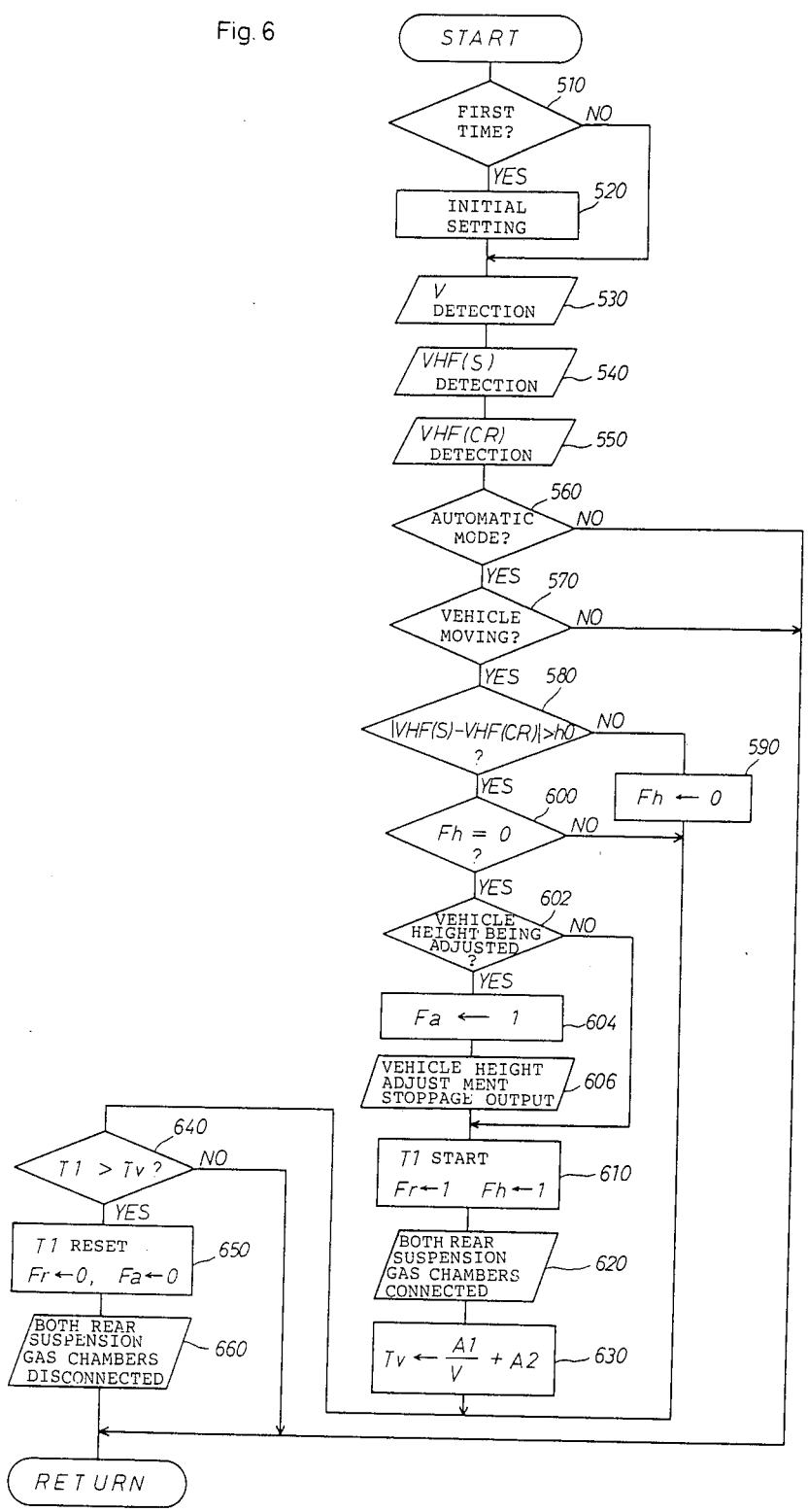
FIG. 6 shows a flow chart of processing steps which are performed in the ECU of the first embodiment.
Figure 7:
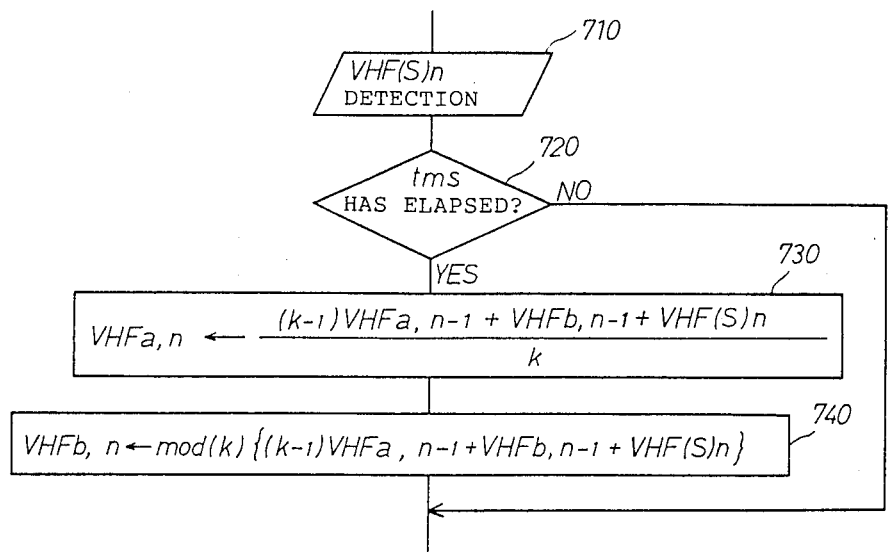
FIG. 7 shows a flow chart of processing steps which are performed in the ECU of the first embodiment to calculate an average value of the vehicle height signal.
Figure 11:
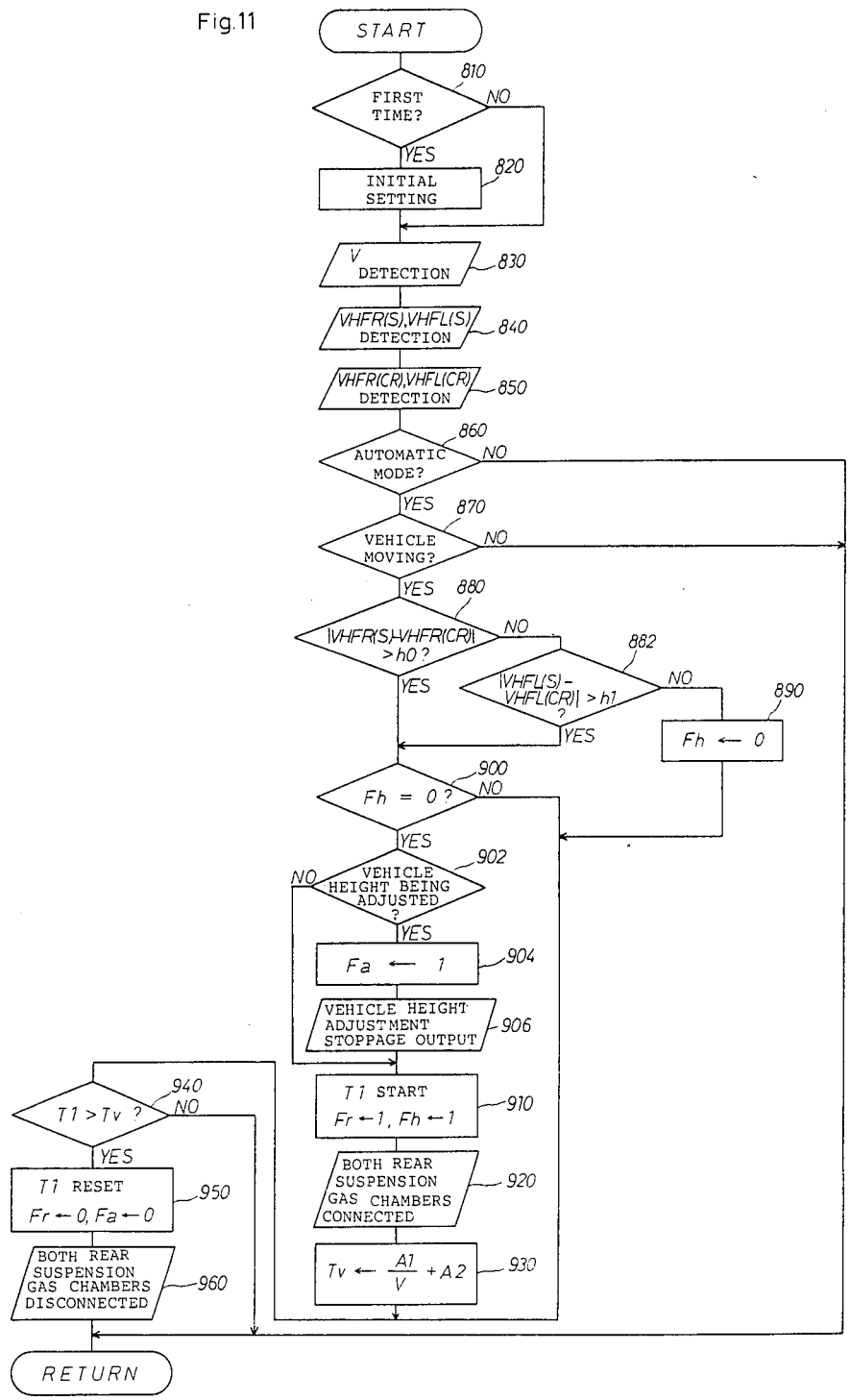
FIG. 11 shows a flow chart of processing steps which are performed in the ECU of the second embodiment.

In the first and the second embodiments, the vehicle height sensors 1 and 2 correspond to the vehicle height detection means; the ECU processing step 580 of the flow chart shown in FIG. 6 and Step 880 and 882 of the flow chart shown in FIG. 11, to the judgment means; and the leveling valves 151 and 152 correspond to open/close means.

What is claimed is:

1. A rear suspension controller for a vehicle including suspensions having gas chambers for gas springs and provided for the right and left rear wheels of the vehicle, comprising:
   a front vehicle height detection means for detecting a distance between a front wheel and the body of the vehicle and for generating a front vehicle height signal corresponding to a substantially instantaneous value of said distance;
   a judgment means for comparing a absolute value of said front vehicle height signal with a predetermined reference signal and for generating a judgment result signal when the absolute value of the front vehicle height signal is greater than the predetermined reference signal;
   passages for connecting the gas chambers of the right and the left rear gas suspensions to each other;
   and open/close means for opening or closing said passages; and
   a rear suspension characteristic alteration means for performing control to open the open/close means for the passages substantially simultaneous with the generating of the judgment result signal.

2. A rear suspension controller as claimed in claim 1, wherein the front vehicle height detection means comprises a right front vehicle height detection means and a left front vehicle height detection means which are separately provided for generating a right front vehicle height signal and a left front vehicle height signal, respectively; and an absolute value of the right front vehicle height signal and an absolute value of the left front vehicle height signal are compared with predetermined reference signals, respectively, by the judgment means to generate the judgment result signal when one of the absolute value of the right and the left front vehicle height signals is greater then the corresponding predetermined reference signal.

3. A rear suspension controller as claimed in claim 1, wherein control for closing the open/close means for the passages is performed by the rear suspension characteristic alteration means for a predetermined time interval after the judgment result signal is generated.

4. A rear suspension controller as claimed in claim 2, wherein control for closing the open/close means for the passages is performed by the rear suspension characteristic alteration means for a predetermined time interval after the judgment result signal is generated.

5. A rear suspension controller as claimed in claim 1, wherein a signal indicating a displacement of the height of the vehicle from the average height thereof is generated as the front vehicle height signal by the front vehicle height detection means.

6. A rear suspension controller as claimed in claim 1, wherein a signal indicating a speed of the displacement of the height of the vehicle is generated as the front vehicle height signal by the front vehicle height detection means.

7. A rear suspension controller as claimed in claim 1, wherein a signal indicating an acceleration of the displacement of the height of the vehicle is generated as the front vehicle height signal by the front vehicle height detection means.

8. A rear suspension controller as claimed in claim 1, wherein a signal indicating an amplitude of the vibration of the height of the vehicle is generated as the front vehicle height signal by the front vehicle height detection means.

9. A rear suspension controller as claimed in claim 1, wherein the rear suspension controller comprises a means for selecting whether or not the front vehicle height signal should be compared with the predetermined reference signal by the judgment means.

* * * * *